United States Patent [19]

Bruyninckx et al.

[11] Patent Number: 5,134,172

[45] Date of Patent: Jul. 28, 1992

[54] ISOCYANATE-REACTIVE COMPOSITIONS

[75] Inventors: Alfons Bruyninckx, Kortenberg; Gabriel Verhelst, Herent, both of Belgium

[73] Assignee: Imperial Chemical Industries PLC, London, England

[21] Appl. No.: 541,804

[22] Filed: Jun. 21, 1990

[30] Foreign Application Priority Data

Jun. 21, 1989 [GB] United Kingdom ............... 8914233

[51] Int. Cl.$^5$ .................. C08L 75/00; C08J 9/16; C08G 18/06
[52] U.S. Cl. .................. 521/137; 521/125; 521/167
[58] Field of Search ............ 521/137, 167, 125

[56] References Cited

U.S. PATENT DOCUMENTS

| | | | |
|---|---|---|---|
| 3,857,800 | 12/1974 | Fishbein et al. | 521/174 |
| 4,436,841 | 3/1984 | Rasshofer et al. | 521/125 |
| 4,438,252 | 3/1984 | Carroll et al. | 521/137 |
| 4,452,923 | 6/1984 | Carroll et al. | 521/167 |
| 4,477,602 | 10/1984 | Liang et al. | 521/137 |

FOREIGN PATENT DOCUMENTS

| | | |
|---|---|---|
| 1555759 | 11/1979 | United Kingdom. |
| 2072204 | 9/1981 | United Kingdom. |

*Primary Examiner*—John Kight, III
*Assistant Examiner*—John M. Cooney, Jr.
*Attorney, Agent, or Firm*—Cushman, Darby & Cushman

[57] ABSTRACT

An isocyanate-reactive composition comprising:
(1) a first isocyanate-reactive compound having a functionality of from 2 to about 4 and an average equivalent weight of from about 750 to about 3000.
(2) a second isocyanate-reactive compound which is normally immiscible with the first isocyanate-reactive compound and has a functionality of at least 2 and an average equivalent weight of at least 30, and
(3) a miscibilizing amount of dispersed polyurethane and/or polyurea particles.

5 Claims, No Drawings

ISOCYANATE-REACTIVE COMPOSITIONS

This invention relates to compositions of matter and more particularly to isocyanate-reactive compositions, to their preparation and to their use in the production of polyurethane and polyurea materials.

The manufacture of useful polymeric materials by reacting organic polyisocyanates with compounds containing a plurality of isocyanate-reactive groups is well established. Thus, polyurethane materials, which may take the form of adhesives, coatings, elastomers, fibres, films, foams, thermoplastics and the like are produced on a large scale by reacting polyisocyanates with polyols. Similarly, polyurea materials may be obtained by reacting polyisocyanates with polyamines or polyimines.

The properties of the final polymeric product may be varied in known manner by appropriate choice of the isocyanatereactive material. Further variation may be obtained by using mixtures of two or more isocyanate-reactive compounds differing in respect of molecular weight, functionality, nature of isocyanate-reactive groups and/or environment of the isocyanate-reactive groups. Thus, many of the formulations used in practice contain an isocyanate-reactive polymer having a functionality of from 2 to 4 and an equivalent weight of from 750 to 3000 and also one or more other active hydrogen compounds which may have equivalent weights in a similar range but which frequently are simple glycols or diamines.

In addition to the polyisocyanate and isocyanate-reactive materials, a practical formulation can contain several other ingredients such as blowing agents, catalysts, surfactants, foam stabilisers, cell openers, fire retardants, fillers, dyes, pigments and internal mould release agents, some of which additives can themselves be isocyanate-reactive. In order to minimise the number of components requiring to be brought together in the final mixing step, it is conventional to pre-blend these individual ingredients to form, if possible, a two-stream system whereby one stream comprises the polyisocyanate and the second stream comprises the isocyanate-reactive materials. Inert additives are commonly included in the isocyanate-reactive stream but can often be incorporated with the polyisocyanate.

It is important that the pre-blends mentioned above should remain substantially stable and uniform in composition from the time of their preparation to the time of their use in the production of polyurethanes, polyureas and the like. In particular, there should be no separation of one or more components from the other components requiring agitation to effect re-homogenisation. This desirable state of affairs is often difficult to achieve in the case of isocyanatereactive compositions containing an isocyanate-reactive polymer together with other isocyanate-reactive species which may or may not be polymeric. This difficulty arises from the well known incompatibility of polymers with other polymers and with other materials. Thus, for example, a polyoxypropylene polyol of the type used in many polyurethane formulations is generally incompatible with a polyether polyol having a high oxyethylene content or with a polyester polyol or with a low molecular weight glycol or diamine.

It has now been found that mixtures of the isocyanate-reactive polymers used in polyurethane and polyurea formulations and normally incompatible isocyanate-reactive materials may be miscibilised by the inclusion of dispersed polyurethane and/or polyurea particles, the resulting compositions being stable for extended periods.

Accordingly, the invention provides an isocyanate-reactive composition comprising:
(1) a first isocyanate-reactive compound having a functionality of from about 2 to about 4 and an average equivalent weight of from about 750 to about 3000;
(2) a second isocyanate-reactive compound which is normally immiscible with the first isocyanate-reactive compound and has a functionality of at least 2 and an average equivalent weight of at least 30, and
(3) a miscibilising amount of dispersed polyurethane and/or polyurea particles.

The expression "functionality" used herein in relation to the isocyanate-reactive compounds refers to the average number of isocyanate-reactive groups per molecule.

The expression "equivalent weight" used herein in relation to the isocyanate-reactive compounds refers to the molecular weight divided by the functionality.

The expression "normally immiscible" used herein in relation to the isocyanate-reactive compounds means that in the proportions being used, and in the absence of the polyurethane or polyurea particles, a mixture of the first and second isocyanate-reactive compounds separates into two distinct phases. It is possible, of course, that the two isocyanate-reactive compounds may be miscible in certain other proportions.

The first isocyanate-reactive compounds present in the composition of the invention may be, for example, a polymeric polyol, polyamine, imino-functional compound or enamine-containing compound.

Suitable polymeric polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyol which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Polyamines which may be present in the compositions of the invention include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Imino-functional compounds which may be present in the compositions of the invention are imino-functional compounds capable of reacting directly with polyisocyanates without prior cleavage of the C=N bond to form a monomeric by-product. Such compounds containing one or more imino groups per molecule and methods for their preparation have been fully described by Gillis et al in U.S. Pat. No. 4,794,129.

Enamine-containing polymers which may be present in the composition of the invention include compounds having the structures:

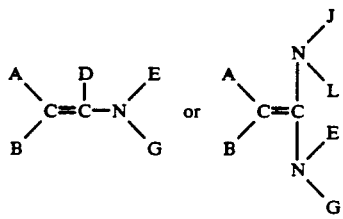

wherein each of A, B, D, E, G, J and L, independently, represents hydrogen or an optionally substituted hydrocarbon radical, any of A, B and D, and, independently, any of E, G, J and L optionally being joined together to form one or more carbocyclic or heterocyclic rings.

In preferred enamine-functional compound E, G, J and L are not hydrogen. It is also preferred that not both of A and B are hydrogen. Especially useful enamino-functional compounds contain two or three enamine groups as a result of A or E being a radical terminating in one or more enamino groups.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexylaldehyde, acetone, methyl ethyl ketone, benzyl methyl ketone, cyclopentanone, cyclohexanone, trimethylcyclohexanone, mixtures of these and the like with a secondary amino-terminated polymer, for example a polyether, having a molecular weight from about 400 to about 9000.

General techniques for the synthesis of enamines have been described in, for example, Org. Coatings and Plastics Chem., 44, 151 and 157, (1981), ACS-PMSE Preprints, August/September 1983, 456 and 461, and U.S. Pat. Nos. 4,342,841 and 4,552,945.

The first isocyanate-reactive compound preferably has an average molecular weight in the range from 2000 to 10000.

The second isocyanate-reactive compound may be any isocyanate-reactive compound that is normally immiscible with the first isocyanate-reactive compound and has a functionality of at least 2 and an average equivalent weight of at least 30. Thus, it may be an isocyanate-reactive polymer having a functionality of from about 2 to about 4 and an average equivalent weight of from about 750 to about 3000 chosen from any of the above mentioned classes from which the first isocyanate-reactive compound may be chosen although, of course, its constitution will be sufficiently different to make it immiscible with said first isocyanate-reactive compound. For example, the first isocyanatereactive compound can be a polyoxypropylene polyol or a poly(oxypropylene-oxyethylene) polyol having an oxyethylene content of up to 20% by weight whilst the second isocyanate-reactive compound is a polyester, for example a poly(diethylene adipate), or a poly(oxypropyleneoxyethylene) polyol having an oxyethylene content of 50% or more.

The second isocyanate-reactive compound may also be a compound having a functionality of at least 2 and an average equivalent weight of from 30 to 750. As example of such compounds, there may be mentioned polymeric and nonpolymeric polyols, polyamines, imino-functional compounds and enamine-containing compounds. The polymeric compounds are lower molecular weight versions of the above mentioned isocyanate-reactive polymers.

Non-polymeric isocyanate-reactive compounds which may be present in the compositions of the invention preferably have molecular weights below 400 and include compounds conventionally used as chain extenders or crosslinking agents. Thus, they include glycols, for example ethylene glycol and 1,4-butanediol, alkanolamines, for example ethanolamine, diethanolamine, triethanolamine and triisopropanolamine, aliphatic diamines, for example ethylene diamine and aromatic polyamines. Useful aromatic polyamines particularly include diamines, especially those having molecular weights between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4-diaminodiphenylmethane, 2,4'-diaminodiphenylmethane, 3,3'-dimethyl-5,5'-diethyl-4,4'-diaminodiphenylmethane, 3,3′5,5'-tetraisopropyl-4,4'-diaminodiphenylmethane and the like and mixtures thereof. Other low molecular weight isocyanate-reactive compounds include phosphorus-containing polyols used as fire retardants.

Still further non-polymeric isocyanate-reactive compounds which may be present in the compositions of the invention as the second isocyanate-reactive compound include non-polymeric categories of the above mentioned imino-functional and enamine-containing compounds. As examples of such non-polymeric compounds, there may be mentioned reaction products of the aforementioned aldehydes and ketones with primary amines such as hexamethylene diamine, menthane diamine, isophorone diamine, xylylene diamine, or 2-methylpentamethylene diamine or secondary amines such as morpholine or piperazine.

The dispersed polyurethane and/or polyurea particles present in the compositions of the invention may be obtained by methods that have been fully described in the prior art, for example by reacting organic polyisocyanates with low molecular weight polyols, alkanolamines or polyamines having primary and/or secondary amino groups in situ in relatively high molecular weight polyols. It is preferred to use dispersed polyurethane and/or polyurethane/polyurea particles obtained by reacting polyisocyanates with alkanolamines, for example triethanolamine, as described for the production of so-called "PIPA polyols" in, for example, EP-A-0079115 and GB-A-2072204. In some cases, the polyurethane and/or polyurea particles can be prepared in situ in the first or second isocyanate-reactive compound.

In general, it is preferred that the dispersed polyurethane and/or polyurea particles have an average particle size of less than 50 microns.

Organic polyisocyanates which may be used in the preparation of the polyurethane or polyurea particles include aliphatic, cycloaliphatic and araliphatic polyisocyanates, for example hexamethylene diisocyanate, isophorone diisocyanate, cyclohexane-1,4-diisocyanate, dicyclohexylmethane-4,4'-diisocyanate and p-xylylene diisocyanate. The preferred polyisocyanates, however, are the aromatic polyisocyanates, for example phenylene diisocyanates, tolylene diisocyanates, 1,5-napthylene diisocyanate and especially the available MDI isomers, that is to say 4,4'-diphenylmethane diisocyanate, 2,4'-diphenylmethane diisocyanate and mixtures thereof.

Whilst diisocyanates are the preferred polyisocyanates, mixtures of diisocyanates with higher functionality polyisocyanates may be used if desired. Such mixtures include polymethylene polyphenyl polyisocyanates (crude or polymeric MDI). Mention may also be made of polyisocyanates (especially MDI) which have been modified by the introduction of urethane, allophanate, urea, biuret, carbodiimide, uretonimine or isocyanurate residues.

The isocyanate-reactive compositions of the invention, suitably containing, on a weight basis, from 25 to 95 parts, preferably 25 to 90 parts of first isocyanate-reactive compound, from 1 to 75 parts, preferably from 5 to 75 parts, most preferably from 2 to 50 parts of second isocyanate-reactive compound, and from 0.5 to 25 parts, preferably from 1 to 25 parts of polyurethane and/or polyurea particles in 100 parts of composition, may be prepared by simple mixing of the components. In some cases, however, stability of the isocyanate-reactive compositions is further improved by pre-blending a dispersion of polyurethane and/or polyurea particles with one of the isocyanate-reactive compounds and then mixing this blend with the other isocyanate-reactive compound.

The compositions of the invention may be used at temperatures ranging between 10° C. and 80° C.

The compositions of the invention may be reacted with organic polyisocyanates using techniques and items of processing equipment that have been fully described in the prior art to form, depending upon the nature of the isocyanate-reactive groups, polyurethanes or polyureas which may take any of the known forms, for example adhesives, coatings, elastomers, fibres, films, foams or thermoplastics.

Organic polyisocyanates which may be reacted with the isocyanate-reactive compositions of the invention include the aliphatic, cycloaliphatic, araliphatic and aromatic polyisocyanates mentioned above in connection with the preparation of the polyurethane and polyurea particles, the preferred polyisocyanate for many purposes being MDI in one of its pure, crude or modified forms.

Reaction between the organic polyisocyanate and the isocyanate-reactive composition of the invention may be performed in the presence of reactive or non-reactive additives already described for use in polyurethane or polyurea processes. In addition to the chain extenders, cross-linkers and the like already mentioned, such additives include blowing agents, catalysts, surfactants, foam stabilisers, cell openers, fire retardants, fillers, dyes, pigments and internal mould release agents.

Blowing agents which may be used include water and inert volatile liquids which vaporise under the influence of the exothermic reaction, such liquids typically having boiling points not exceeding 100° C., preferably not exceeding 50° C., at atmospheric pressure.

Catalysts which may be used include tertiary amines such as 1,4-diazabicyclo[2.2.2]octane, N,N-dimethylethanolamine, bis(2-dimethylaminoethyl)ether, N-ethylmorpholine and N,N'-diethylpiperazine and tin compounds such as stannous octoate and dibutyltin dilaurate.

Surfactants and foam stabilisers which may be used include oxyethylated alkylphenols, ethylene oxide-propylene oxide block copolymers and siloxane-oxyalkylene copolymers.

Fire retardants may be of the isocyanate-reactive or non-reactive types and fillers may be organic, particulate or fibrous.

If desired, one or more of the above mentioned additives may be incorporated in the compositions of the invention.

The invention is illustrated but not limited by the following Examples.

GLOSSARY

Polyol A: 6000 molecular weight, 15% EO tipped triol (containing approx. 80% primary OH groups), commercialised by ICI under the name Daltocel F2805.

Polymer polyol B: a graft polymer polyol, 20% solids dispersion (acrylonitrile/styrene) and 80% of a high reactivity, 5000 molecular weight, 15% EO tipped triol (containing approx. 80% primary OH groups), commercialised by BP under the name Polyurax U2603.

Polymer polyol C: a so-called PIPA polyol which is a 20% solids dispersion (polyurethane) and 80% of a high reactivity glycerol based 15% EO tipped triol (containing approx. 80% primary OH groups) as described in GB-A-2072204. Polyol D: 4000 molecular weight, TMP based triol containing about 75% ethylene oxide randomly distributed commercialised by ARCO under the name A2580.

Polyester E: liquid adipate polyester of approximately 2500 molecular weight.

Polyol F: polyoxyethylene sorbitol commercialised by ICI under the name Atlas G 2005.

Polyol G: polyether diamine which is based on a predominately polyethyleneoxide backbone of approximately 2000 molecular weight; commercialised by Texaco under the name Jeffamine ED 2001.

Niax Al: amine catalyst supplied by Union Carbide
Dabco 33LV: amine catalyst supplied by Air Products
B4113: silicone surfactant supplied by Goldschmidt
Arcton 11: trichlorofluoromethane supplied by ICI.

EXAMPLE 1—COMPARATIVE

Composition 1 was prepared by blending 10 parts by weight (pbw) of polyol D with 90 pbw of polyol A. The stability of the blend was evaluated at 20° C. - 25° C.

The blend showed poor stability as indicated in table 1 herebelow.

EXAMPLES 2 and 3

Compositions 2 and 3 were prepared according to example, by blending 10 parts by wt of polyol D with 90 pbw of polyol B and polyol C respectively. The corresponding blend stabilities are indicated in table 1. Results showed particularly improved stability for composition 3.

EXAMPLE 4—COMPARATIVE

Composition 4 was prepared as in example 1, by blending 25 pbw of polyol D with 75 pbw of polyol A.

The blend showed reduced stability as indicated in table 1.

EXAMPLES 5-6

Compositions 5 and 6 were prepared as in example 4 by blending 25 pbw of polyol D with 75 pbw of polyol B and polyol C respectively.

The corresponding blend stabilities are indicated in table 1. Results show particularly improved stability for composition 6.

|  | Components | | | | | |
|---|---|---|---|---|---|---|
|  | 1 | 2 | 3 | 4 | 5 | 6 |
|  | pbw | | | | | |
| Polyol A | 90 | — | — | 75 | — | — |
| Polymer polyol B | — | 90 | — | — | 75 | — |
| Polymer polyol C | — | — | 90 | — | — | 75 |
| Polyol D | 10 | 10 | 10 | 25 | 25 | 25 |
| Blend stability (days) at 20–25° C. | <5 | <20 | >30 | <5 | <10 | >30 |

EXAMPLE 7—COMPARATIVE

Composition 7 was prepared as described in example 1, by blending 10 pbw of polyester polyol E with 90 pbw of polyol A.

The blend stability was evaluated at 45° C.

The blend showed reduced stability (less than 5 days) as indicated in table 2 herebelow.

EXAMPLE 8

Composition 8 was prepared by blending 10 pbw of polyester polyol E with 90 parts by wt of polyol C.

The blend showed particularly improved stability (see table 2).

EXAMPLE 9—COMPARATIVE

Composition 9 was prepared as in example 7, by blending 25 pbw of polyester polyol E with 75 pbw of polyol A.

The blend showed reduced stability (see table 2).

EXAMPLE 10

Composition 10 was prepared as in example 7, by blending 25 pbw of polyester polyol E with 75 pbw of polyol C.

The blend showed particularly improved stability as compared with example 9.

|  | Components | | | |
|---|---|---|---|---|
|  | 7 | 8 | 9 | 10 |
|  | pbw | | | |
| Polyol A | 90 | — | 75 | — |
| Polymer polyol C | — | 90 | — | 75 |
| Polyester E | 10 | 10 | 25 | 25 |
| Blend stability (days) at 45° C. | <5 | >30 | <5 | >30 |

EXAMPLE 11—COMPARATIVE

Composition 11 was prepared by blending 20 pbw of polyol F with 80 pbw of polyol A, as described in example 1.

The stability of the blend was evaluated at 20° C. -25° C. Results showed reduced stability for the blend (less than 5 days) as indicated in table 3 herebelow.

EXAMPLE 12

Composition 12 was prepared as in example 11 by blending 20 pbw of polyol F with 80 pbw of polyol C.

The blend showed particularly improved stability as compared with composition 11 (see table 3).

EXAMPLE 13—COMPARATIVE

Composition 13 was prepared by blending 50 parts by wt of polyol F with 50 pbw of polyol A, as described in example 11.

The blend showed reduced stability (less than 5 days) as indicated in table 3.

EXAMPLE 14

Composition 14 was prepared as in example 11 by blending 50 pbw of polyol F with 50 pbw of polyol C.

The blend showed a particularly improved stability as compared with example 13 (see table 3).

|  | Components | | | |
|---|---|---|---|---|
|  | 11 | 12 | 13 | 14 |
|  | pbw | | | |
| Polyol A | 80 | — | 50 | — |
| Polymer polyol C | — | 80 | — | 50 |
| Polyester F | 20 | 20 | 50 | 50 |
| Blend stability (days) at 20–25° C. | <2 | >30 | <2 | >30 |

EXAMPLE 15

Composition 15 was prepared by blending 10 pbw of polyol G with 90 pbw of polyol A as described in example 1.

The stability of the blend was evaluated at 60° C. Results indicated poor stability for the blend (less than 5 days) as indicated in table 4 herebelow.

EXAMPLE 16

Composition 16 was prepared as in example 15, by blending 10 parts of polyol G with 90 pbw of polyol C.

The blend showed particularly improved stability (see table 4) as compared with example 15.

EXAMPLE 17—COMPARATIVE

Composition 17 was prepared as in example 15, by blending 25 pbw of polyol G with 75 pbw of polyol A. Results indicated poor stability for the blend (table 4).

EXAMPLE 18

Composition 18 was prepared as in example 17, by blending 25 pbw of polyol G with 75 pbw of polyol C.
p The blend showed a particularly improved stability as compared with composition 17 (see table 4).

|  | Components | | | |
|---|---|---|---|---|
|  | 15 | 16 | 17 | 18 |
|  | pbw | | | |
| Polyol A | 90 | — | 75 | — |
| Polymer polyol C | — | 90 | — | 75 |
| Polyester F | 10 | 10 | 25 | 25 |
| Blend stability (days) at 20–25° C. | <5 | >25 | <5 | >25 |

EXAMPLE 19

The following example relates to stability evaluation of a completed isocyanate-reactive composition, which comprises, in addition to the various polyols hereabove described, a number of additives such as $H_2O$, catalysts, blowing agents. The isocyanate-reactive composition 19 was prepared by mixing 77 pbw of polyol A, 17.2 pbw of polyol C, 5.8 pbw of polyol D, 2.75 pbw of $H_2O$, 0.1 pbw of Niax A 1, 1 pbw of DABCO 33 LV, 1 pbw of B 4113, 15 pbw of Arcton 11. The stability of the isocyanate-reactive composition was evaluated at 20° C.–25° C. The composition showed excellent stability for a period of more than 30 days.

We claim:
1. An isocyanata-reactive composition comprising:
   (1) a first isocyanate-reactive compound having a functionality of from about 2 to about 4 and an average equivalent weight of from about 750 to about 3000, said first isocyanate-reactive compound being a polyoxypropylene polyol or a poly-(oxypropylene-oxyethylene) polyol having an oxyethylene content of up to 20% by weight;
   (2) a second isocyanate-reactive compound which is normally immiscible with the first isocyanate-reactive compound and has a functionality of at least 2 and an average equivalent weight of at least 30, said second isocyanate-reactive compound being a poly(oxypropylene-oxethylene) polyol having an oxyethylene content of at least 50% by weight; and
   (3) from 0.5 to 25 parts of at least one member of the group consisting of dispersed polyurethane and polyurea particles.
2. A composition accordinng to claim 1 wherein the dispersed polyurethane or polyurea particles are reaction products of an organic polyisocyanate with an alkanolamine.
3. A compositon according to claim 1 containing, on a weight basis, from 25 to 95 parts of first isocyanate-reactive compound, from 1 to 75 parts of second isocyanate-reactive compound and from 0.5 to 25 parts of said particles in 100 parts of composition.
4. A composition according to claim 1 obtained by pre-blending a dispersion of said particles with one of the isocyanate-reactive compounds and then mixing this blend with the other isocyanate-reactive compound.
5. A polymeric material obtained by reacting an organic polyisocyanate with an isocyanate-reactive composition according to claim 1.

* * * * *